United States Patent [19]
Rink

[11] Patent Number: 5,074,637
[45] Date of Patent: Dec. 24, 1991

[54] OPTICAL FIBER CONNECTOR

[75] Inventor: Dan L. Rink, Oakland, Calif.

[73] Assignee: Xintec Corporation, Oakland, Calif.

[21] Appl. No.: 532,884

[22] Filed: Jun. 4, 1990

[51] Int. Cl.$^5$ .............................................. G02B 6/38
[52] U.S. Cl. ...................................................... 385/56
[58] Field of Search ............... 350/96.20, 96.21, 96.22, 350/96.23

[56] References Cited

U.S. PATENT DOCUMENTS

| | | | |
|---|---|---|---|
| 3,803,409 | 4/1974 | Prochazka | 350/96.21 X |
| 4,553,814 | 11/1985 | Bahl et al. | 350/96.21 |
| 4,812,009 | 3/1989 | Carlisle et al. | 350/96.21 |
| 4,867,523 | 9/1989 | Scott, Jr. | 350/96.20 |
| 4,880,291 | 11/1989 | Aberson, Jr. et al. | 350/96.21 |
| 4,881,792 | 11/1989 | Alameel et al. | 350/96.20 |
| 4,898,446 | 2/1990 | Hinckley | 350/96.20 |
| 4,900,125 | 2/1990 | Iyer | 350/96.21 |

*Primary Examiner*—Brian Healy

[57] ABSTRACT

An improved bayonet optical connector includes, in one aspect, a connector having a nut provided with at least one bayonet slot. The bayonet slot includes a detent portion to retain a bayonet pin of a mating connector, and a camming edge extends obliquely from the detent portion distally toward the mating connector. The camming edge(s) extend about a substantial portion of the nut, so that manually pushing the two connector components together causes impingement of the bayonet pin(s) on the camming edge(s), and urges the bayonet nut to rotate to bring the detent portion(s) into engagement with the pin(s). The invention also includes a nut cover secured about the bayonet nut to enhance grasping and manipulation of the bayonet nut. The bayonet nut is free of all portions of the connector except the bayonet nut, to that it acts to improve both the handling of the connector assembly and rotation and translation of the bayonet nut. Another aspect of the invention is an adapter assembly for connecting a bayonet optical connector to a threaded optical connector. The adapter assembly includes an adapter body a bore extending therethrough, and internal threads at one end of the bore to engage a threaded optical connector. The other end of the adapter body includes bayonet pins to engage the nut of a bayonet connector, and the bore is provided with stepped annular features or the like to establish a fixed distance from the bayonet connector to the threaded connector.

22 Claims, 7 Drawing Sheets

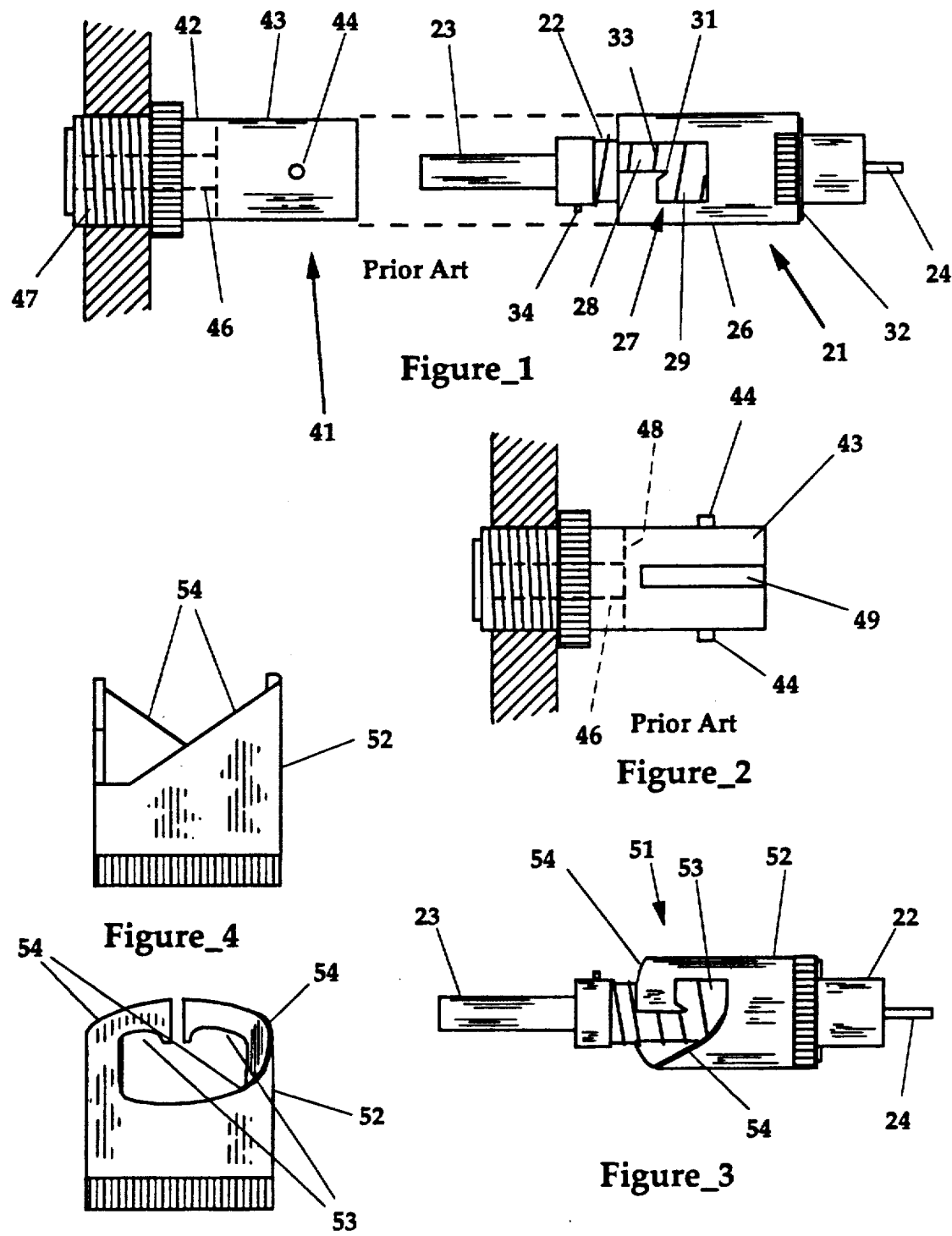

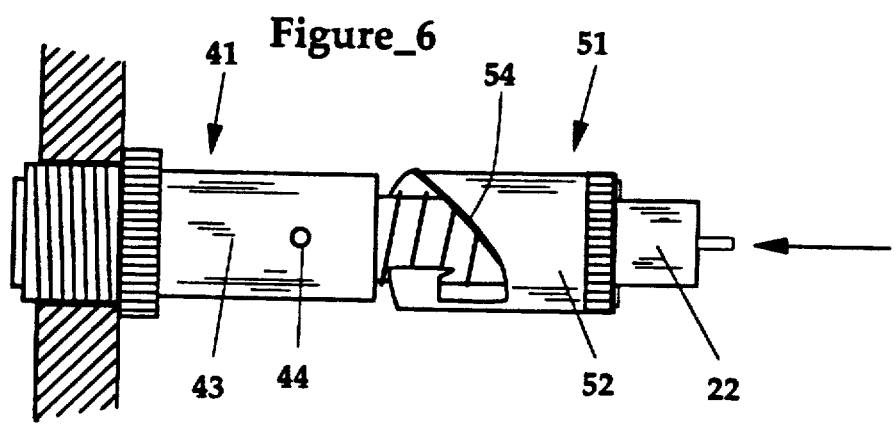
Figure_6
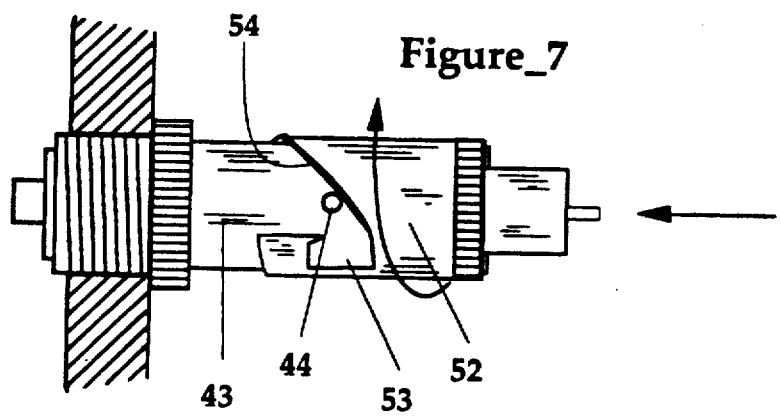
Figure_7
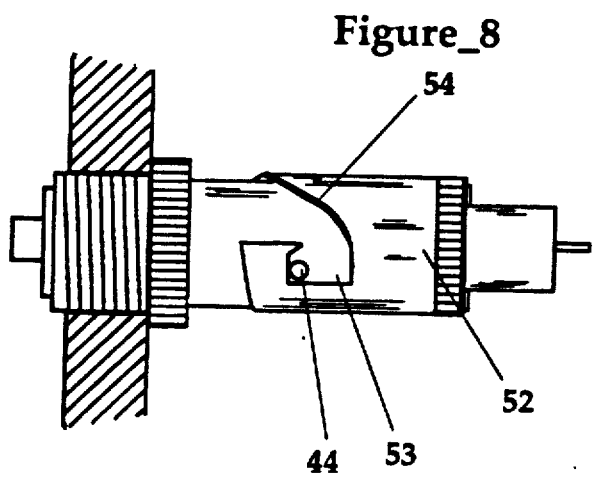
Figure_8

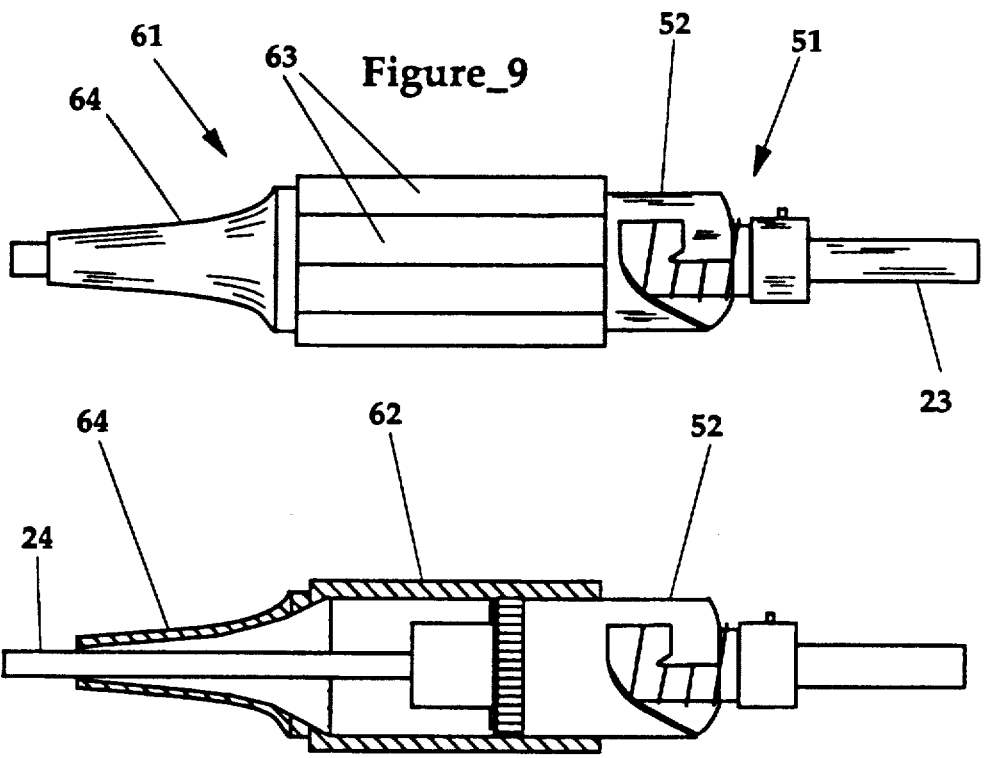
Figure_9
Figure_10
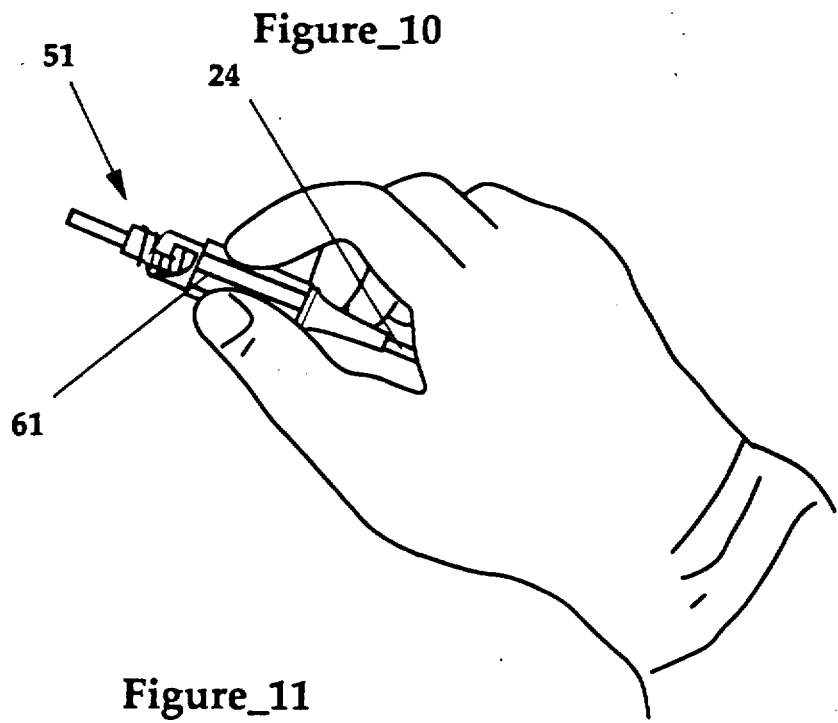
Figure_11

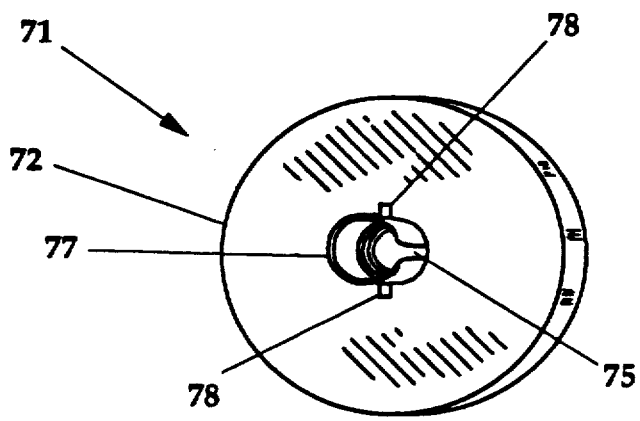
Figure_12
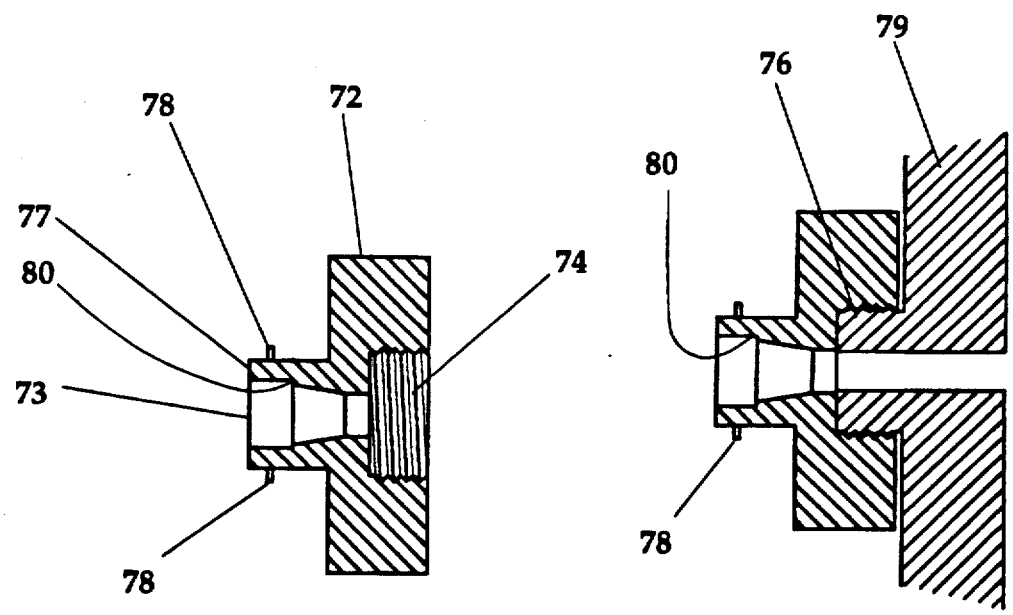
Figure 13
Figure_14

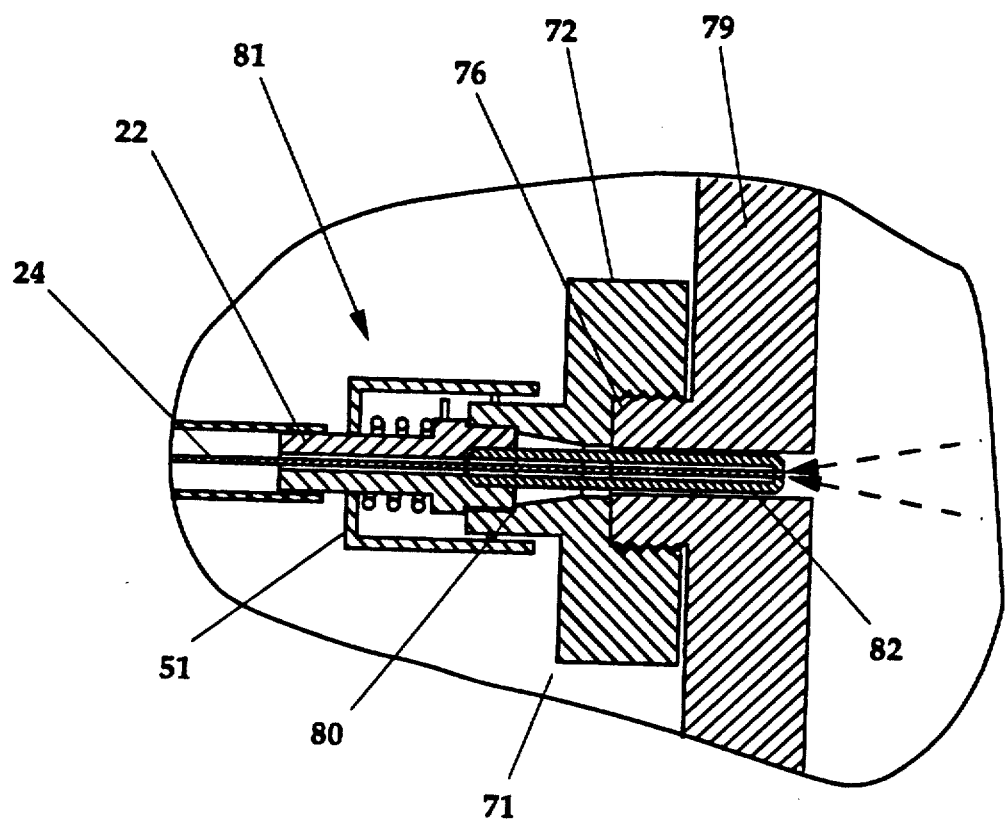
Figure_15

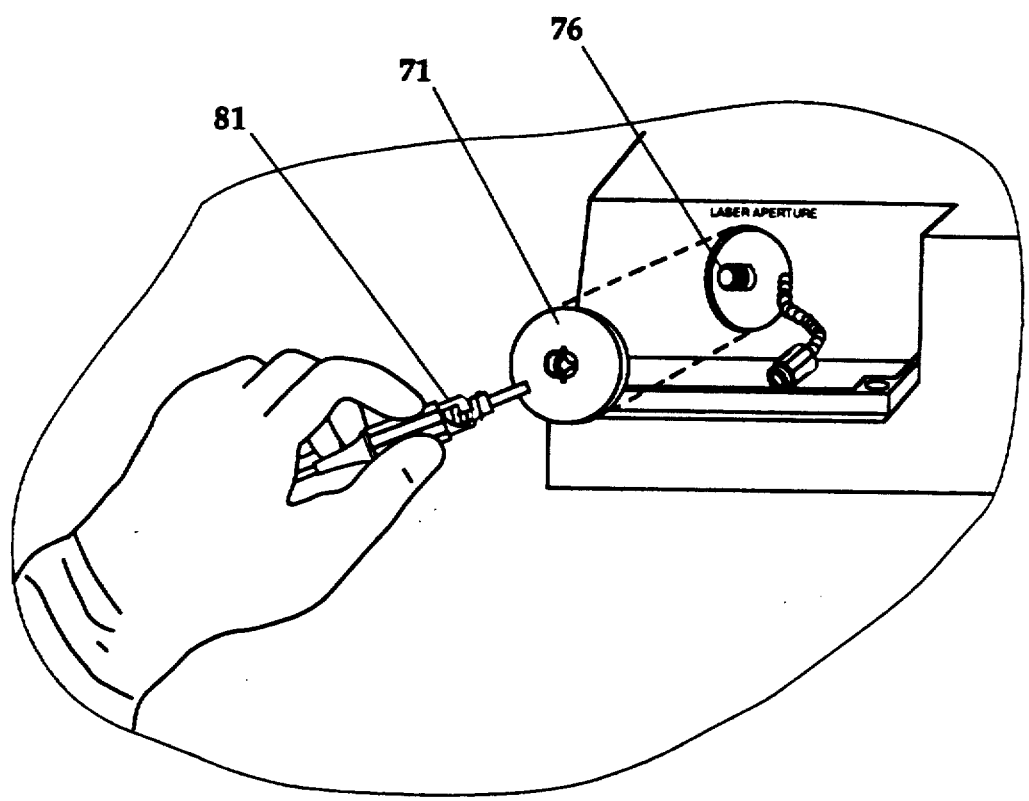
Figure_16

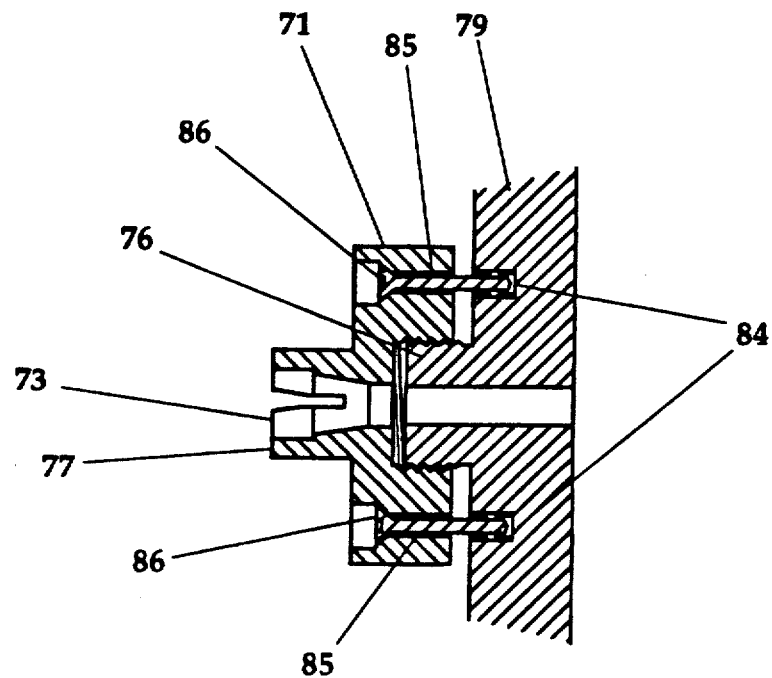
Figure_17
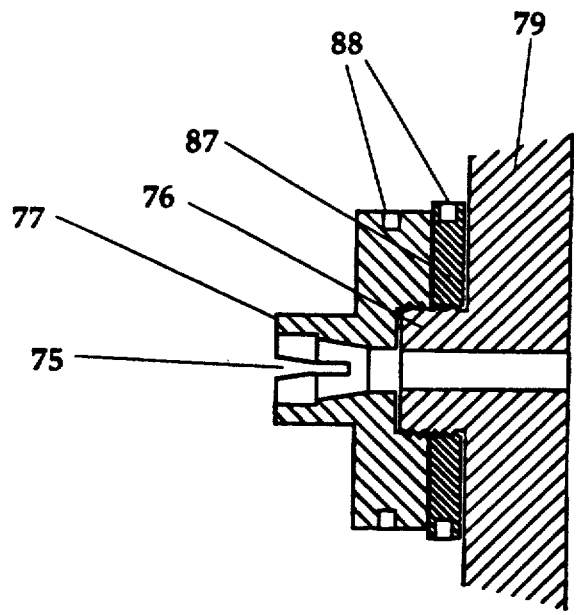
Figure_18

OPTICAL FIBER CONNECTOR

BACKGROUND OF THE INVENTION

The development of optical fibers for transmission of laser light with low loss has facilitated the widespread application of lasers in communications, industry, and medicine. To couple optical fibers to lasers and laser-powered devices, connectors have been developed which properly orient and position the optical fiber ends for input and output purposes. The connectors have evolved into two major types, threaded connectors and bayonet connectors, which have become standardized. Standardization has permitted the interconnection of lasers, optical fibers, and end-user devices from a wide variety of manufacturers.

Unfortunately, the standardization of optical connectors has had the effect of freezing the development and improvement of optical connectors, and has institutionalized some serious-shortcomings in the state of the art. For example, although the standard connectors are much larger than the diameter of the typical optical fiber, they are too small to be grasped and manipulated easily by many individuals. The standard threaded optical connector assembly (SMA type) includes a male connector provided with a small nut adjacent to its distal end, and this nut must be rotated through several complete revolutions to effect a secure connection. However, when the male connector is inserted in the complementary female connector, the nut is typically disposed directly adjacent to a housing or bulkhead wall which supports the female connector, and grasping and rotating the nut is an awkward and difficult task.

The standard bayonet connector assembly (STC type) generally includes an alignment pin extending radially outwardly, requiring the male plug to be closely scrutinized and rotated to effect proper alignment for full insertion of the male plug. Thereafter the bayonet pin(s) of the female connector must be scrutinized and aligned with the bayonet slot(s) of the male connector, and then the male connector must be rotated to engage the bayonet pin(s) and slot(s).

It may be appreciated that both forms of optical connectors requires close visualization of the connectors, and a high degree of manual dexterity to effect connection and disconnection. A comparison with electrical connectors is instructive in highlighting the shortcomings of optical connectors. Typical audio connectors such as RCA-type phone plugs permit connection by simple insertion of a male plug ferrule in a female plug receptacle. Electrical power connectors generally include spade lugs that are inserted into receptacles in a female plug. In most cases a casual glimpse and a single motion is sufficient to effect connection or disconnection of audio or power connections. In contrast, prior art optical connectors generally require close and continued visualization, and several intricate manual motions to effect connection or disconnection. Clearly there is a need to improve the design and function of optical connectors.

It should also be noted that bayonet optical connectors and threaded optical connectors are mutually incompatible, and that devices provided with one form of optical connector are thus prevented from using transmission systems and delivery systems which are equipped with the other form of optical connector.

SUMMARY OF THE PRESENT INVENTION

The present invention generally comprises an improved bayonet optical connector assembly which overcomes many of the drawbacks of prior art optical connectors. In one aspect of the invention, there is provided a bayonet connector component having a nut which includes at least one slot to engage and releasably retain a bayonet pin of a mating connector component. Each slot includes a detent portion which retains the bayonet pin, and a camming edge extending obliquely and smoothly from the detent portion to the distal edge of the nut. The camming edges of the slots extend about a substantial portion of the nut, so that manually pushing the two connector components together causes impingement of the bayonet pin(s) on the camming edge(s), and urges the bayonet nut to rotate to bring the detent portion(s) into engagement with the pin(s). Thus the mere act of insertion of one connector component into the receptacle of the other, at any angular relationship about the common axis of the assembly, serves to latch the components together.

Another aspect of invention includes the provision of an optical connector nut cover which is secured to the nut typically provided on an optical connector component. The nut is dimensioned to engage the nut, and to clear the other portions of the optical connector component, so that the cover is free to rotate and translate with the nut. The nut cover has a relatively large outer diameter and other surface features which are designed to facilitate manual grasping and manipulating of the nut cover, so that the nut engaged therein may be manipulated easily to facilitate connection and disconnection of the optical connector component.

A further aspect of the invention provides an adapter assembly for connecting a bayonet optical connector to a threaded optical connector. The adapter assembly includes an adapter body having opposed ends and a bore extending axially therethrough, and internal threads at one end of the bore to engage a threaded optical connector. The other end of the adapter body is provided with bayonet pins to engage the nut of a bayonet connector, and the bore is provided with stepped annular features or the like to establish a fixed distance from the bayonet connector to the threaded connector, to effect efficient light transfer between the connected optical fibers or optical fiber and input source.

BRIEF DESCRIPTION OF THE DRAWING

FIGS. 1 and 2 are plan views of typical prior art bayonet connector components.

FIG. 3 is a plan view of the improved bayonet connector component of the present invention.

FIG. 4 is a side elevation of the bayonet nut of the present invention.

FIG. 5 is a side elevation of the bayonet nut of the present invention, rotated 90° from the FIG. 4 depiction.

FIGS. 6-8 are a sequence of views showing the male bayonet connector component of the present invention being assembled to a female bayonet component.

FIG. 9 is a plan view of the bayonet nut cover and driver of the present invention assembled to the bayonet connector component of the invention.

FIG. 10 is a cutaway view of the bayonet nut cover and driver of the present invention, as shown in FIG. 9.

FIG. 11 is a perspective view of the bayonet connector-nut cover assembly in use.

FIG. 12 is a perspective view of the adapter of the present invention for connecting a typical bayonet optical connector to a typical threaded optical connector.

FIG. 13 is a cross-sectional elevation of the adapter depicted in FIG. 12.

FIG. 14 is a cross-sectional elevation of the adapter of FIGS. 12 and 13, shown assembled to the male component of a typical threaded optical connector.

FIG. 15 is a cross-sectional elevation of the adapter of FIGS. 12 and 13, shown assembled to the male component of a typical threaded optical connector and a typical bayonet optical connector.

FIG. 16 is a perspective exploded view of the adapter of the invention, together with a typical laser output port and an optical fiber having a bayonet connector.

FIG. 17 is a cross-sectional elevation of a further embodiment of the adapter of the invention, showing set screws for achieving a predetermined axial rotational disposition of the adapter.

FIG. 18 is a cross-sectional elevation of a further embodiment of the adapter of the invention, showing a lock nut for achieving a predetermined axial rotational disposition of the adapter.

DESCRIPTION OF THE PREFERRED EMBODIMENT

One aspect of the preferred embodiment of the invention includes an improved bayonet optical connector. With regard to FIGS. 1 and 2, a typical bayonet optical connector known in the prior art includes a male connector component 21 and a female connector component 41. The male component 21 includes a tubular connector body 22 joined at its proximal end to an optical fiber 24, with a ferrule 23 extending distally from the connector and supporting the distal end of the optical fiber 24. A bayonet nut 26 is secured about a medial portion of the body 22, the nut 26 typically including a pair of bayonet slots 27. Each bayonet slot 27 is L-shaped, having a narrow entrance opening 28 and a detent portion 29 separated by a detent lip 31. The nut 26 is freely disposed about the connector body, and is resiliently positioned against a stop 32 (generally a C-clip) by a spring 33 secured about the body 22. A typical nut 26, which is the portion grasped manually, is approximately 0.3 in. (7.6 mm) in diameter. Many male bayonet connectors are provided with a locator pin 34 extending radially from the distal end of the connector body 22.

The female optical connector 41 is typically comprised of a cylindrical sleeve 43 extending from a tubular member 42. A pair of baronet pins 44 extend diametrically from the sleeve 43, and are dimensioned to pass through the inlet openings 28 of the bayonet slots 27 of the connector component 21. The tubular member 42 includes an axial bore 46 extending therethrough and dimensioned to receive the ferrule 23. The end 47 is provided with external threads to facilitate mounting on apparatus such as a laser light source. Typically, the connector 41 is disposed to that the laser output focal point coincides with the position of the distal end of optical fiber in the ferrule 23 when the ferrule is fully inserted in the bore 46 and the distal end of the ferrule is abutting the end 48 of the tubular member 42. The sleeve 43 includes a slot 49 extending longitudinally therein to receive the locating pin 34 of the mating connector.

To effect secure connection between the components 21 and 41, component 21 is grasped by the nut 26 and the ferrule 23 is inserted through the sleeve 43 into the bore 46 of the member 42. While moving the components together axially, the pin 34 is first aligned with the slot 49, so that the body 22 may be inserted into the sleeve 34. Thereafter the bayonet pins 44 are aligned with the opening 28 of the bayonet slots 27 and inserted therein, and the nut 26 is urged distally and rotated to engage the pins 44 in the detent portions 29 of the bayonet slots. It may be appreciated that this connection process requires close visual scrutiny, a high degree of manual dexterity and a great amount of patience. The task is made more difficult by the small diameter of the nut 26, and the fact that the sleeve 43 of the connector 41 is often extended from a panel or housing, affording little clearance for the fingers grasping the nut 26.

In the improved optical bayonet connector of the invention, shown in FIGS. 3–5, components common to prior art bayonet connectors are provided with like reference numerals. The improved connector includes a male connector 51 having a bayonet nut 52 joined to the connector body 22 as described previously. A pair of bayonet slots are provided in diametrical opposition, each bayonet slot including a detent portion 53, and a camming edge 54 extending obliquely therefrom in a smoothly curved fashion toward the distal end of the nut. It should be noted that the camming edge of one bayonet slot extends distally of and adjacent to the detent portion of the the other bayonet slot, so that substantially the entire exposed end surface of the nut is comprised of the camming edges 54.

With regard to FIGS. 5–8, the camming edges 54 eliminate the prior art difficulties in aligning the bayonet pins 44 and bayonet slot openings 28. After the ferrule 23 of connector 51 is inserted through the sleeve into the bore 46 of the connector 41, the connector 51 is urged toward the connector 41 (FIG. 6). The bayonet pins 44 impinge on the camming edges 54 (FIG. 7), and the axial force causes the nut to rotate and bring the detent portions 53 into engagement with the pins 44. Thereafter the nut is released and the connectors is joined. To the user of the improved connector, the joining of the connectors 41 and 51 appears to occur "automatically", in that the nut 51 rotates into the proper bayonet junction without any effort on the part of the user.

A further aspect of the invention directed to improving prior art bayonet optical connectors includes a bayonet nut cover 61, shown in FIGS. 9–11. The nut cover 61 comprises a tubular sleeve 62 having an internal diameter dimensioned to extend about a proximal portion of the bayonet nut 52 of the connector 51, and to form a frictional engagement therewith so that the nut cover 61 and the bayonet nut 51 rotate and translate together. (Indeed, the nut cover may also be used in conjunction with the prior art connectors 21 described previously.)

The outer surface of the tubular sleeve 62 is provided with surface features than enhance the ability of the nut cover to be grasped and manipulated. These surface features may includes a plurality of longitudinally extending planar facets, which may define a geometrical prism of rectangular, pentagonal, hexagonal, or octagonal configuration, or the like. Such facets are more easily grasped than the smooth cylindrical surface of the nut 51 (or 21). Likewise, the outer surface of the nut cover may be knurled or roughened to increase the frictional effect thereof to enhance the manual grip on the nut cover. Moreover, the greater diameter of the sleeve 62 compared to the nut 51 further increases the ability of the user to grasp and operate the connector.

A tapered end 64 extends from the sleeve 62 to enclose the portion of the optical fiber entering the connector 51. The end 64 is provided with an internal diameter sufficiently large to clear the optical fiber and any other portions associated with the connector 51. Thus the nut cover 61 is joined only to the bayonet nut 52, and is free of any other engagement. Therefore, the nut cover serves not only as a means to facilitate grasping and manipulating the entire connector 51 (FIG. 11), but also as a bayonet nut rotator and driver during the connection and disconnection process.

A further aspect of the invention comprises an adapter for permitting the interconnection of bayonet optical connectors with threaded optical connectors. With reference to FIGS. 12-14, an adapter 71 includes an adapter body 72 having a bore 73 extending axially therethrough. Although the body 72 is depicted as a cylindrical disk, it may be appreciated that any convenient shape may be provided. A counterbore 74 at one end of the bore 73 is threaded and dimensioned to be secured to the threaded end 76 of a typical optical connector, such as the industry standard SMA connectors. It is significant that the counterbore is sufficiently shallow so that the end 76 fully inserts into the counterbore 74 before the adapter body 72 impinges on the panel 79 from which the connector 76 extends. Thus a bayonet connector secured to the adapter is spaced a predetermined, fixed distance with respect to the threaded connector.

At the other end of the adapter, the bore 73 extends coaxilly through a tubular neck portion 77. The outer diameter of the neck 77 is substantially the same as the diameter of the standard bayonet optical connector sleeve 42, described previously with regard to FIGS. 1 and 2. Furthermore, a pair of bayonet pins 78 extend diametrically from the neck 77, in correspondence to the pins 44 of the prior art connector 42. The bore 73 includes an annular step 80 disposed therein. A slot 75 extends longitudinally in one side of the neck to accommodate the locating pin 34 often provided on standard bayonet connectors. The neck 77 thus is arranged to be engaged by a standard bayonet connector component 21, or, preferably, by an improved optical connector component 51 described above.

With regard to FIGS. 15 and 16, the adapter 71 may be employed by threading the counterbore end 74 onto the end 76 of a threaded optical connector. A bayonet connector 81 is then inserted into the bore 73 of the adapter, the ferrule 82 of the connector 81 extending through the bore 73 into the bore of the threaded connector. It should be noted that the ferrule 82 is slightly longer than the ferrule of a standard bayonet connector to compensate for the added depth of the adapter 71. The ferrule is inserted fully until the distal end of the body 22 abuts the annular step 80 in the bore 73. The connector 81 preferably includes a standard connector body 22 joined to an optical fiber 24, and an improved nut 51 is secured about the body 22. The nut 51 is employed as described previously to secure the connector 81 to the adapter 71 and to the threaded optical connector.

It should be noted that the connection and disconnection functions of the connector 76 are not impaired in any manner by the adapter 71. Furthermore, the adapter 71 may be removed easily to permit the use of threaded optical connectors once again.

With regard to FIG. 17, the adapter 71 may be modified so that locator pin slot 75 may be oriented at any desired angle about the axis of the bore 73. The panel or housing 79 is provided with a pair of tapped holes 84, preferably spaced diametrically with respect to the connector 76. The adapter body 72 is provided with a pair of screw holes 85 spaced to align with the holes 84. The adapter 71 is threaded onto the connector 76, but it is not tightened completely thereon. Rather, the adapter is rotated into the proper orientation, in which the slot 75 is disposed at the desired angle and the holes 84 and 85 are aligned. A pair of screws 86 are then inserted through the holes 85 and secured in the threaded holes 84 to maintain the desired disposition of the adapter 71 and the slot 75. The slot alignment is thus a function of the placement of the holes 84 and their relationship to the placement of the holes 85 in the adapter 71.

Alternatively, the adapter 71 may be modified, as shown in FIG. 18, so that the adapter slot 75 may be disposed at any variable angle. Joined to the threaded connector 76 is a lock nut 87, which may be provided with spanner wrench detents 88 in the periphery thereof. The lock nut is first assembled to the threaded connector, followed by the adapter 71, as described previously. When the locator pin slot 75 is disposed in the desired angular orientation, the lock nut is rotated to impinge against the adapter body 75, immobilizing the adapter body and fixing the angle of the slot 75. The adapter body 72 may be provided with peripheral spanner wrench detents 88 as well, so that the body 72 and lock nut 87 may be tightened together to prevent rotation thereof.

I claim:

1. In a bayonet optical connector assembly having male and female plug components, a bayonet nut secured concentrically and rotatably to one of said components and having at least one bayonet slot extending into the distal end thereof to engage at least one bayonet pin extending outwardly from the other of said components, said bayonet slot including a detent portion for engaging and securing the bayonet pin, the improvement comprising means for directing said bayonet pin into said detent portion as said male and female components are urged together axially in mating engagement, said means for directing said bayonet pin includes camming edge means extending obliquely from said detent portion of said bayonet slot to said distal end of said bayonet nut, said camming edge means comprising a smooth curved surface extending from said detent portion of said slot to said distal end of said bayonet nut, said smooth curved surface comprising an exposed end surface of said distal end of said bayonet nut, whereby axial engagement of said male and female components causes impingement of said bayonet pin on said camming edge means and urges said bayonet nut to rotate to bring said detent portion of said slot into engagement with said bayonet pin.

2. The improved bayonet optical connector assembly of claim 1, wherein said smooth curve comprises a segment approximating a portion of a helix.

3. In a bayonet optical connector assembly having male and female plug components, a bayonet nut secured concentrically and rotatably to one of said components and having at least one bayonet slot extending into the distal end thereof to engage at least one bayonet pin extending outwardly from the other of said components, said bayonet slot including a detent portion for engaging and securing the bayonet pin, the improvement comprising means for directing said bayonet pin into said detent portion as said male and female components are urged together axially in mating engagement, and a bayonet nut cover secured about said bayonet nut.

4. The improved bayonet optical connector assembly of claim 3, wherein said bayonet nut cover includes a body portion having an inner diameter dimensioned to receive said bayonet nut in frictional fit engagement for rotation in common therewith.

5. The improved bayonet optical connector assembly of claim 4, said bayonet nut cover further including a tail portion extending from said body portion and tapering therefrom, said tail portion having an inner diameter sufficient to effect non-impingement with said one bayonet plug component and the optical fiber extending therefrom, whereby said bayonet nut cover is free to rotate and translate with respect to all portions of said one plug component except said bayonet nut.

6. The improved bayonet optical connector assembly of claim 4, wherein said body portion includes means to enhance manual grasping of said one plug component.

7. An adapter assembly for connecting a bayonet optical connector to a threaded optical connector, including an adapter body having first and second ends and a bore extending axially therebetween, said bore including a portion adjacent said second end dimensioned to receive the ferrule of a bayonet optical connector, a threaded portion adjacent said first end for engaging the threads of the threaded optical connector, at least one bayonet pin extending outwardly from said adapter body and disposed adjacent to said second end, said adapter body including a portion adjacent to said second end having a diameter dimensioned to receive the bayonet nut of a bayonet optical connector, said adapter body including means for seating a bayonet optical connector at a predetermined spacing with respect to the threaded optical connector.

8. The adapter assembly of claim 7, wherein said threaded portion comprises internal threads disposed within said bore.

9. The adapter assembly of claim 7, wherein said means for seating includes a tapered portion of said bore disposed to matingly engage a flared portion of the bayonet connector.

10. The adapter assembly of claim 7, wherein said means for seating includes an internal flange within said bore disposed to matingly engage an annular portion of the bayonet connector.

11. The adapter assembly of claim 7, wherein said means for seating a bayonet optical connector at a predetermined spacing with respect to the threaded optical connector includes means for spacing said adapter body at a fixed, predetermined axial spacing with respect to the threaded optical connector.

12. The adapter assembly of claim 11, wherein said means for spacing includes an annular step within said bore adjacent to said first end, said annular step disposed to impinge on an outer end of said threaded optical connector.

13. The adapter assembly of claim 7, further including means for joining said adapter body to the threaded optical connector at a predetermined angular disposition with respect to the axis of the adapter body.

14. The adapter assembly of claim 13, wherein said means for joining includes at least one set screw extending from said adapter body and disposed to engage an object fixedly joined to the threaded optical connector.

15. The adapter assembly of claim 13, wherein said means for joining includes a lock nut securable on said threaded optical connector and engagable with said adapter body.

16. The adapter assembly of claim 7, further including a slot extending in said second end of said adapter body, said slot disposed to receive an orientation pin extending from the bayonet connector.

17. The adapter assembly of claim 16, further including smoothly curving edge portions extending from said slot to said second end of said adapter body.

18. In a bayonet optical connector assembly having male and female plug components, a bayonet nut secured concentrically and rotatably to one of said components and having at least one bayonet slot extending into the distal end thereof to engage at least one bayonet pin extending outwardly from the other of said components, the improvement comprising a bayonet nut cover joined to the bayonet nut to facilitate grasping and manipulation thereof.

19. The improved bayonet optical connector assembly of claim 18, wherein said bayonet nut cover includes a body portion having an inner diameter dimensioned to receive said bayonet nut in frictional fit engagement for rotation in common therewith.

20. The improved bayonet optical connector assembly of claim 19, said bayonet nut cover further including a tail portion extending from said body portion and tapering therefrom, said tail portion having an inner diameter sufficient to effect non-impingement with said one bayonet plug component and the optical fiber extending therefrom, whereby said bayonet nut cover is free to rotate and translate with respect to all portions of said one plug component except said bayonet nut.

21. The improved bayonet optical connector assembly of claim 20, wherein said body portion includes means to enhance manual grasping of said one plug component.

22. In a bayonet optical connector assembly having male and female plug components, a bayonet nut secured concentrically and rotatably to one of said components and having at least one bayonet slot extending into the distal end thereof to engage at least one bayonet pin extending outwardly from the other of said components, said bayonet slot including a detent portion for engaging and securing the bayonet pin, the improvement comprising means for directing said bayonet pin into said detent portion as said male and female components are urged together axially in mating engagement, said means for directing said bayonet pin including camming edge means extending obliquely from said detent portion of said bayonet slot to said distal end of said bayonet nut, said bayonet nut including a pair of bayonet slots disposed in diametrical opposition in the distal end thereof, the camming edge means of said pair of bayonet slots comprising substantially all of the exposed end face of the distal circumference of said bayonet nut, whereby axial engagement of said male and female components at any angular alignment about the axis of the assembly causes impingement of said bayonet pin on said camming edge means and urges said bayonet nut to rotate to bring said detent portion of said slot into engagement with said bayonet pin.

* * * * *